Oct. 24, 1967  L. ASSALIT  3,348,742
AEROSOL VALVE
Filed Sept. 30, 1965
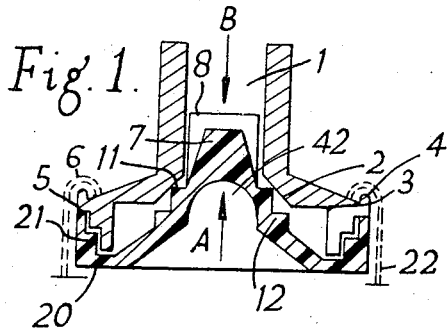
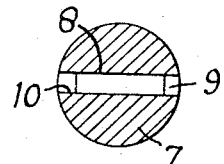
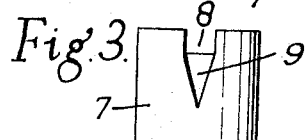
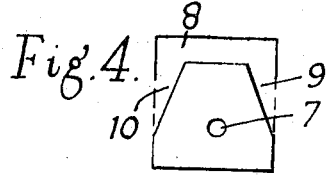
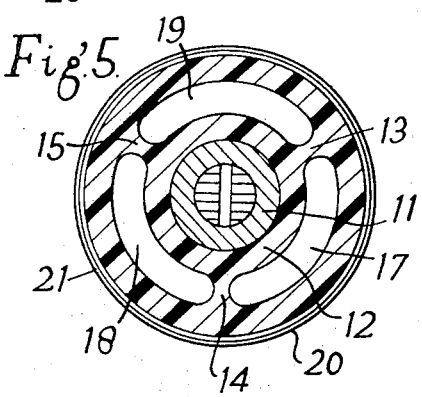
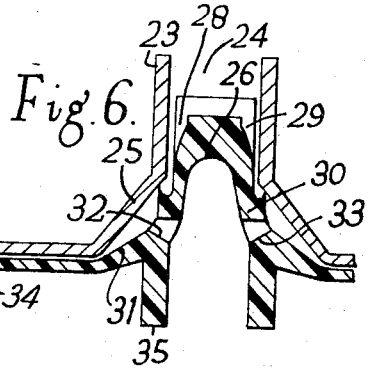
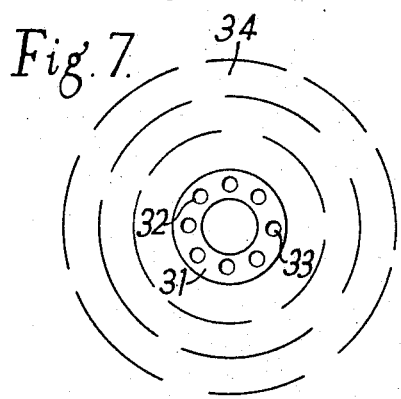
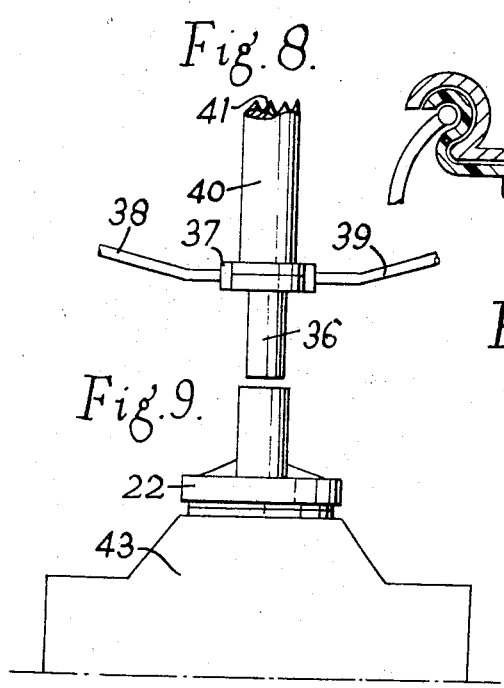
INVENTOR:
LOUIS ASSALIT

United States Patent Office 3,348,742
Patented Oct. 24, 1967

3,348,742
AEROSOL VALVE
Louis Assalit, 20 Rue des Colonies,
Marseille, France
Filed Sept. 30, 1965, Ser. No. 491,736
Claims priority, application France, Oct. 5, 1964,
20,713, Patent 1,410,846
4 Claims. (Cl. 222—394)

The existing aerosol valves consist of an assembly of multiple parts, joints and springs, which increase the cost prices and inevitably show operational defects.

In view of the small passage sections, it is necessary to fill the body of the aerosol with active products and also with propellant before the mounting of the valve, whence the necessity to use very low temperatures or to carry out a filling in two stages.

Furthermore, the flow cannot be regulated and it is impossible to project substances of different viscosity or at high pressures.

The object of this invention is an aerosol valve, of simplified manufacture, which is speedily fitted and operates in a manner which is impossible to unset, with an absolute seal, ensuring a progressive flow and allowing, at any vertical or reversed position, of using any pressures with products of different viscosities.

It is characterized by the means which are used, both as a whole and separately and, more particularly, by a rigid mounting with tubular central tip of which the internal base is extended by a beveled mouth, the valve itself consisting of a cylindrical mass of a dimension which corresponds to that of a rigid mouth into which it slides; the upper face of this full cylinder is equipped with a diametral horizontal notch, of which the bottom ends join oblique joints (or slits) with a profile which decreases towards the bottom; the base of this mass comprises a shoulder which forms a toric joint which presses against the oblique part of the mounting and ensuring the seal of the closing; this assembly is connected, at the periphery of the mounting, by a flexible and perforated surface which forms the setting joint.

On the accompanying drawings which are used for showing a non-limiting constructional example of one of the forms of the construction of the object of the invention:

FIG. 1 shows a section view of the valve as a whole.

FIGS. 2, 3 and 4 represent the constructional details of the valve which ensures the passage of the product.

FIG. 5 is a plan view of the lower part, which is flexible, which forms the valve and the setting joint.

FIGS. 6, 7 show, in section and in plan, a variation of the construction.

FIG. 8 shows a control device of the valve.

FIG. 9 shows the aerosol valve fitted on the container.

The valve consists of a rigid external element forming an armature consisting of a cylindrical duct 1, with a beveled mouth 2 which is at the base, extending by a plane surface 3 with angle at 90° forming a vertical wall 4.

The external face 5 of that wall is profiled, whereas the upper external part has a niche 6 for receiving the setting.

The internal flexible element, which is circular in shape, includes a cylindrical mass 7 of the same diameter as duct 1 within which it slides and is equipped, on its upper wall, with a diametral notch 8, of suitable depth; at each end of this notch, that is to say, on both sides of the ridge of the bottom of the notch, oblique vertical notches are made in the shape of a V, 9, 10, joining the diametral notch at a given point in FIGS. 1, 2, 3, 4.

The lower part of this cylindrical mass is equipped with a circular portion 11 forming a seal at the height of the beveled part of the mounting. A shoulder 12 is used as base at the spaces 13, 14 and 15 between which are the open spaces or ducts 17, 18 and 19; and a circle or shroud 20, and encircling wall 21 complete the internal flexible element.

The setting 22 assembles those elements in their operating position.

According to the variation in fulfillment represented in vertical position on FIGS. 6, 7, the external mounting 23 still comprises its cylindrical duct 24 and the beveled base 25.

The internal element still consists of the cylindrical mass 26 with diametral slit 27 and oblique vertical outlets 28, 29 in the shape of a V.

The sealing shoulder 30 is situated at the upper end of conical wall of the mounting.

The spaces and open spaces or ducts are replaced, in this variation of the invention, by a flexible plate 31 having circumferentially arranged apertures 32, 33.

The diaphragm 34 is set with the mounting. A plunger end 35 completes this assembly.

The valve can operate with a conventional integrated pushrod but, for certain substances, use is made of the device which is represented in FIG. 8, namely:

A tubular plunging element 36 which is intended to contact the cylindrical mass, with thrust limiting buffer 37 and holding arms 38, 39. A tubular cylindrical length 40 with decorator profile 41 ensures the discharge.

The operating of this valve can now be seen as follows:

The valve, FIGS. 1 to 5, can be used, more particularly, for the products which are to be distributed in reversing the aerosol container, that is to say, the orifice of duct 1 is turned towards the bottom.

Under the effect of the pressure of the propelling gas, the product to be atomized or projected carries out a thrust into the cavity 42, arrow A. The sealing joint 11 presses against the oblique wall 2 of the mounting and the seal is complete.

If pressure is applied to the piston or cylindrical mass 7, arrow B, the joint is slightly disengaged and the product contained in the chamber 43 passes through spaces or ducts 17, 18 and 19 and then through the space between the joint 11 and the wall 2.

It reaches the base of the oblique slits 9, 10 and escapes, at a limited flow, through duct 1. If one reaches the base of slit 8, the flow is at the maximum. This manoeuvre is carried out, either with the aid of the appliance as per FIG. 8 or by a built-in control.

There is thus a flow which is progressive and possible to adjust, in proportion to the displacement of piston 7 and in the vacuum of lateral slits 9, 10.

This use in a reversed position applies to the distribution of products such as chantilly cream, pasty products or even liquids.

If the aerosol is to be used vertically, FIGS. 6, 7, the device which is similar to that of FIGS. 1 to 5 from the operating point of view, includes a plunger tube 35 which goes to the bottom of the chamber 43 and penetrates into the mass of the product to be "projected" on which there is the propelling fluid.

By lowering the piston 26, the sealing joint 30 of the oblique wall 25 is separated and the product is projected into the slits 28, 29 from the perforations 32, 33 before reaching the maximum flow near slit 27.

There is thus obtained a progressive setting which is still in proportion to the driving-in of mass 26.

The elasticity which forms a hinge obtained by spacers 13, 14, 15 in the device in FIGS. 1, 5, is obtained by a perforated plate or flexible diaphragm 31 which has the advantage of being rolled for the setting by forming a sealing joint.

In any case, the fixed rigid part combined with the flexible mobile element and the notches of the piston, characterize the invention.

This simplified valve, in two parts, is precise and allows of a progressive flow which can be set, which depends upon the degree of penetration, offers a maximum number of useful effects as compared with the devices which are used and have been used so far in the "aerosol bombs" where the springs, micrometric orifices and complex assemblies are the cause both of bad operating and high cost prices.

Furthermore, the flow with large hole allows of a filling, even after setting, of the neck 22 and the accessory, FIG. 8, which can be used for the distribution can be used for refilling.

This appliance can also be filled in accordance with the known methods and the use of aerosol can also be applied for the projection of any product which is finely divided.

The aerosol valve, with or without plunger tube according to whether vertical or reversed use is made, ensures the distribution of the "chantilly" cream which has so far been produced by siphons. The gaseous emulsion is perfect and this new application is only possible owing to the mobile cylindrical mass which is horizontally notched, as well as vertically, by oblique cuts which ensure a flow which can be set. Furthermore, this valve can be adapted to any openings or necks of the most differing capacities.

Nevertheless, the shapes, dimensions and arrangements of the different elements can vary within the limit of the equivalents, and this also applies to the materials used for the manufacture thereof, without thereby changing the general design of the invention which has just been described.

I claim:

1. An aerosol valve of adjustable flow comprising a rigid mounting including a tubular cylindrical duct having a flared and internally beveled base with vertical side wall defining a chamber, a movable element formed of resiliently compressible material and including a cylindrical portion disposed in the tubular duct of the mounting and having a diametral notch in its outer end and opposed lateral V-shaped notches extending axially inwards from said diametral notch, said movable element including a shoulder to abut against the beveled portion of the base and a flexible diaphragm portion extending radially outwards from the inner end of the cylindrical portion to the periphery of the base of the mounting, said movable element being apertured for passage of material to the duct of the mounting.

2. An aerosol valve of adjustable flow, as claimed in claim 1, wherein the cylindrical portion is a solid mass and wherein the movable element is apertured in the flexible diaphragm for passage of material to the duct of the mounting.

3. An aerosol valve of adjustable flow, as claimed in claim 1, wherein the cylindrical portion is hollow and wherein the movable element has apertures in the wall of the cylindrical portion for passage of material to the duct of the mounting.

4. An aerosol valve of adjustable flow, as claimed in claim 3, including a plunger tube depending from the cylindrical portion of the movable element.

References Cited

UNITED STATES PATENTS

| | | | |
|---|---|---|---|
| 289,447 | 12/1883 | Rich | 222—514 |
| 1,735,902 | 11/1929 | Johanson | 222—518 X |
| 1,744,358 | 1/1930 | Brown et al. | 222—518 X |
| 2,772,819 | 12/1956 | Poarchet et al. | 222—394 |
| 2,779,518 | 1/1957 | Morris | 222—518 X |
| 2,861,723 | 11/1958 | Cooksley | 222—394 |
| 2,951,646 | 9/1960 | Efford et al. | 222—394 X |

RAPHAEL M. LUPO, *Primary Examiner.*